Figure 1:
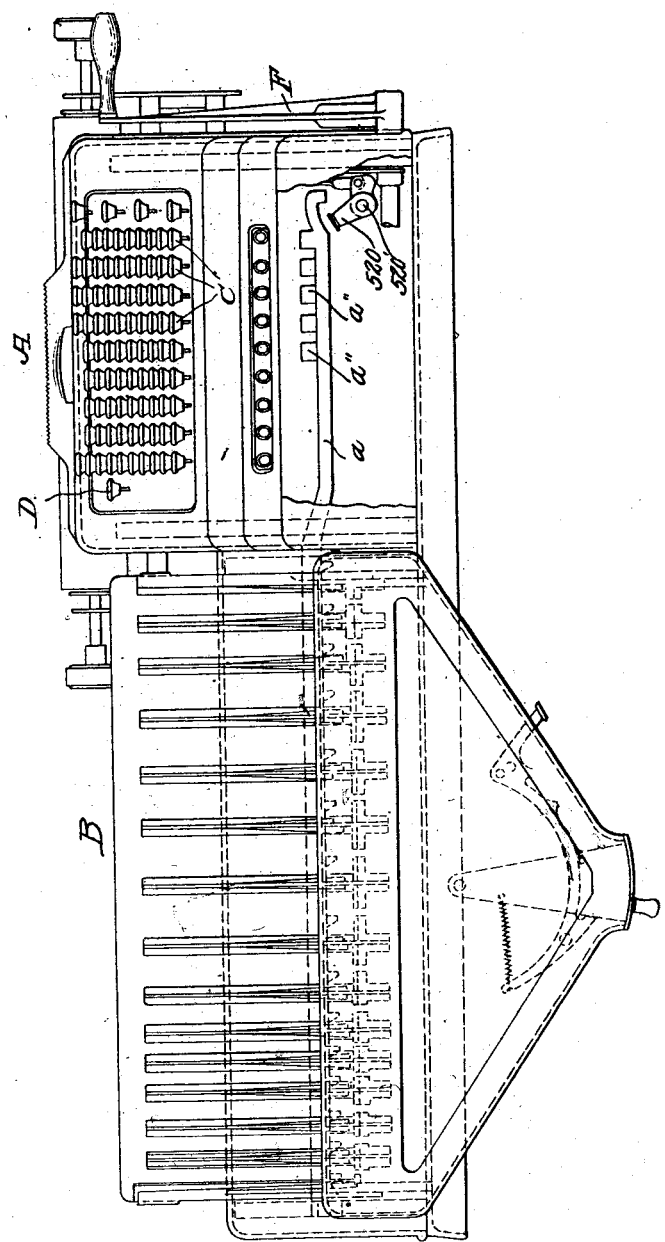

G. RUNQUIST.
MONEY PAYING MACHINE.
APPLICATION FILED MAR. 11, 1915.

1,195,860.

Patented Aug. 22, 1916.
6 SHEETS—SHEET 1.

WITNESSES:

INVENTOR.
G. Runquist
BY
ATTORNEY

G. RUNQUIST.
MONEY PAYING MACHINE.
APPLICATION FILED MAR. 11, 1915.

1,195,860.

Patented Aug. 22, 1916.
6 SHEETS—SHEET 3.

WITNESSES:
INVENTOR.
BY
ATTORNEY

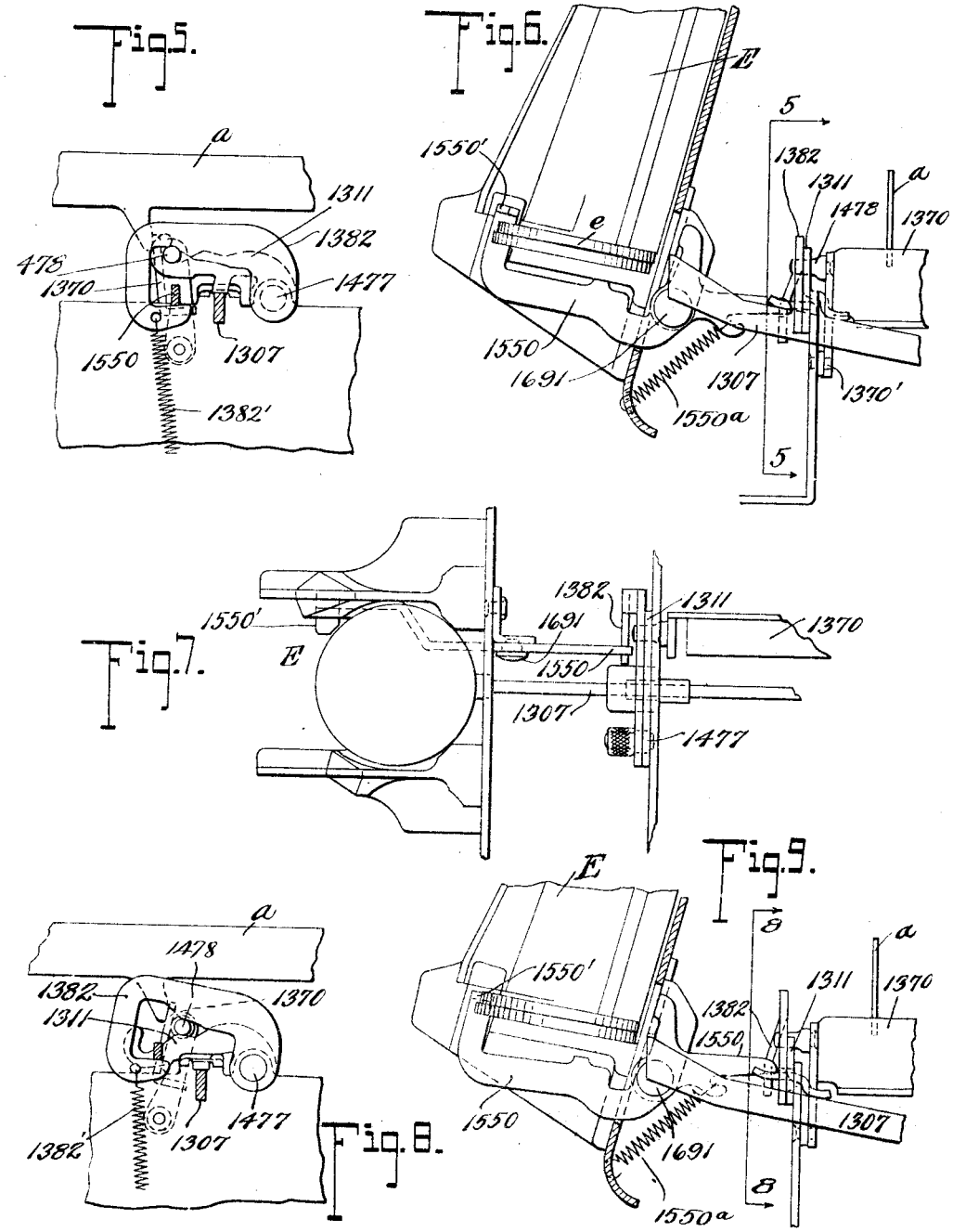

G. RUNQUIST.
MONEY PAYING MACHINE.
APPLICATION FILED MAR. 11, 1915.
1,195,860.
Patented Aug. 22, 1916.
6 SHEETS—SHEET 5.
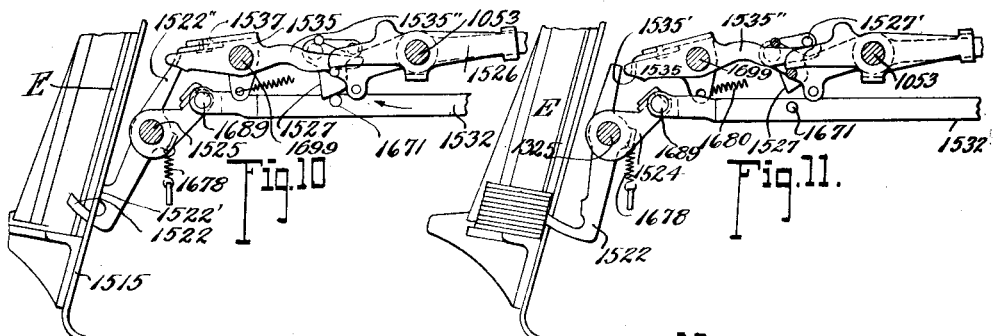
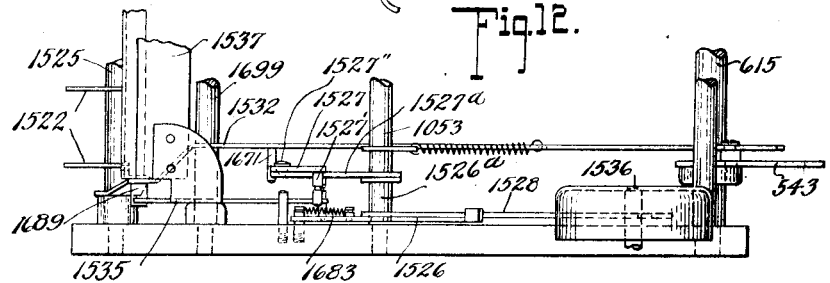
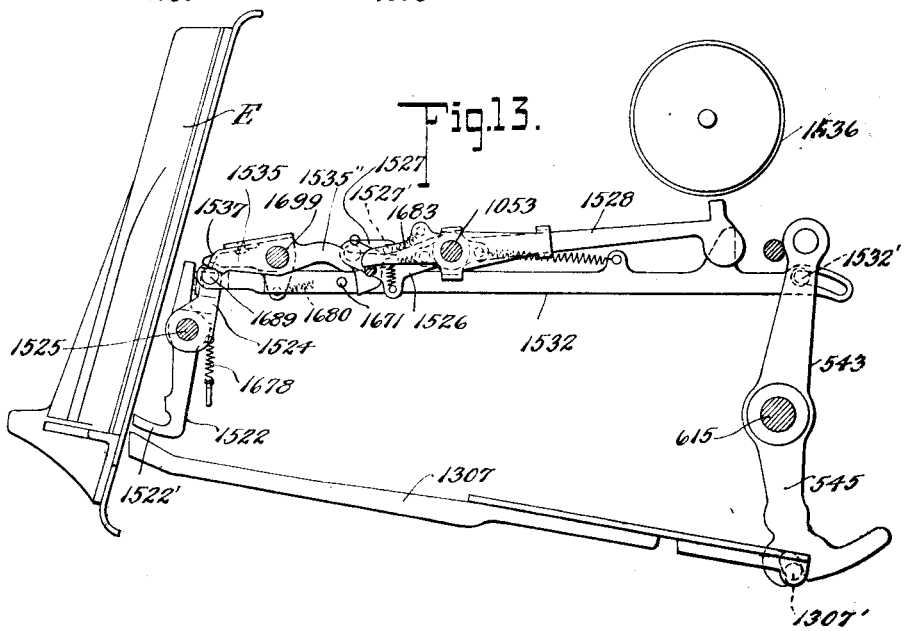
WITNESSES.
INVENTOR
G. Runquist
BY
ATTORNEY G. RUNQUIST.
MONEY PAYING MACHINE.
APPLICATION FILED MAR. 11, 1915.
1,195,860.
Patented Aug. 22, 1916.
6 SHEETS—SHEET 6.
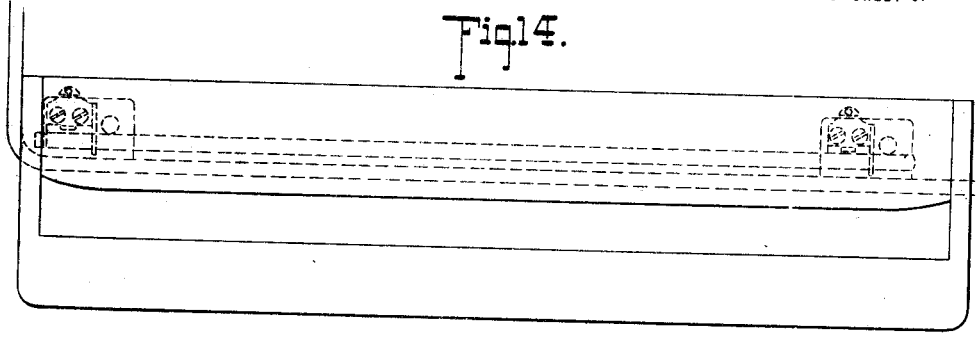
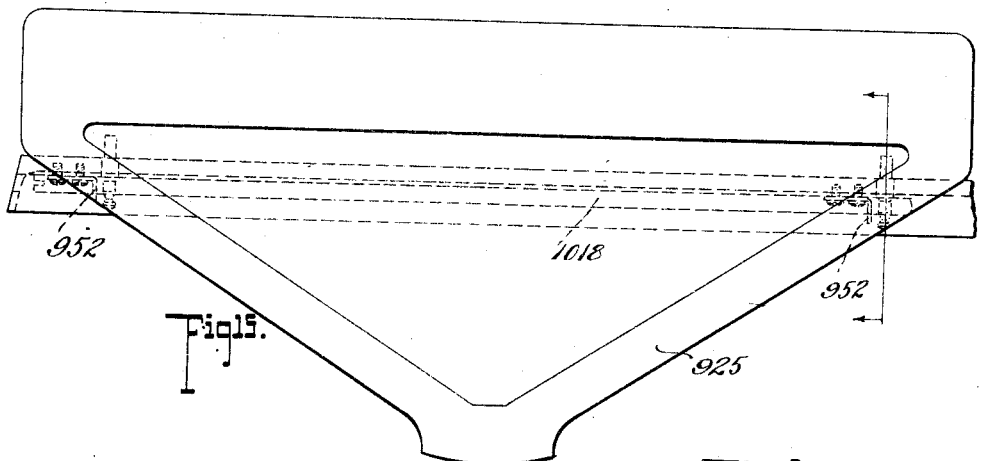
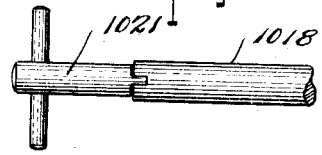
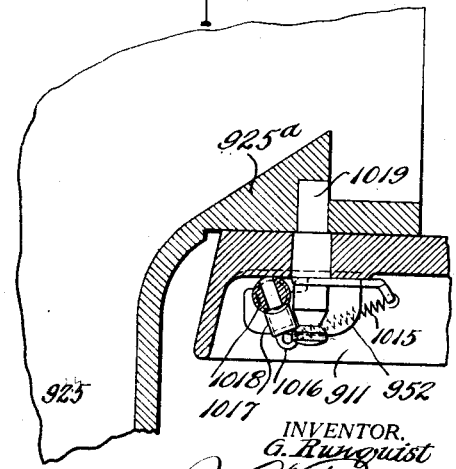
WITNESSES:
C. H. Wagner
L. Compton
INVENTOR.
G. Runquist
BY
ATTORNEYS.

UNITED STATES PATENT OFFICE.

GUSTAF RUNQUIST, OF TERRE HAUTE, INDIANA, ASSIGNOR TO INTERNATIONAL MONEY MACHINE COMPANY, OF TERRE HAUTE, INDIANA.

MONEY-PAYING MACHINE.

1,195,860.          Specification of Letters Patent.   Patented Aug. 22, 1916.

Application filed March 11, 1915.  Serial No. 13,711.

*To all whom it may concern:*

Be it known that I, GUSTAF RUNQUIST, a subject of the King of Sweden, residing at Terre Haute, in the county of Vigo and State of Indiana, have invented certain new and useful Improvements in Money-Paying Machines, of which the following is a specification.

The present invention appertains primarily to the art of money handling machines, and embodies improvements in respect to the various instrumentalities controlling the predetermining and ejecting means used in machines of this class.

In money paying machines it is absolutely necessary that the instrumentalities employed for discharging money or coins operate positively and accurately so as to avoid liability of mis-payment. Furthermore, it is common in this type of machines to utilize money holders with which coöperate double and single payment ejectors. That is to say, ejectors are provided which when controlled by a certain key eject a single coin whereas when controlled by a different key two coins will be discharged from the receptacle holding the same. Heretofore it has been difficult to control with absolute assurance the operation of such particular ejectors so that a part of this invention resides in the provision of a positive coin stop controlled to move in front of the coin above that to be discharged by single ejection to render impossible a double discharge when a single coin only of the particular denomination is required for the payment predetermined by the controlling instrumentalities of the machine.

Still another object of the present invention has been to devise certain improvements in signaling or alarm devices associated with the money receptacles of the machine so that in the event the supply of coins in a certain receptacle requires replenishment the operator will be promptly advised through the automatic operation of a suitable signal, preferably an alarm bell.

The invention further comprises an improved form of ejector designed primarily for insuring the proper delivery of coins which are very thin, such as dimes for instance, it having been difficult heretofore with ordinary ejectors to prevent accidental buckling or bending of the thin coin before it is ejected, thus choking or clogging up the coin holder and making the delivery therefrom inoperative. This difficulty is overcome by the present improvements.

The invention also involves other detail features of improvement which will be more fully presented hereinafter and finally claimed.

Figure 2:
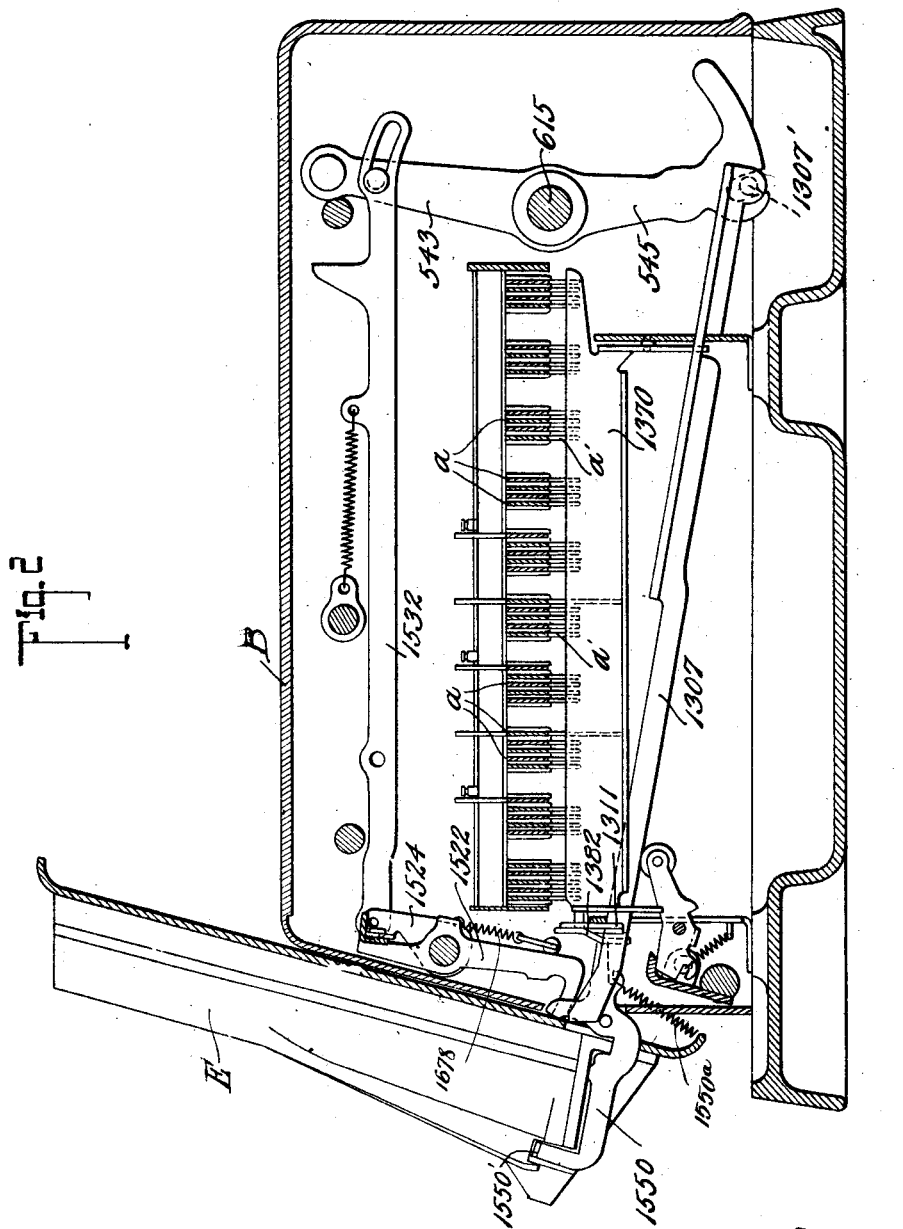
Figure 3:
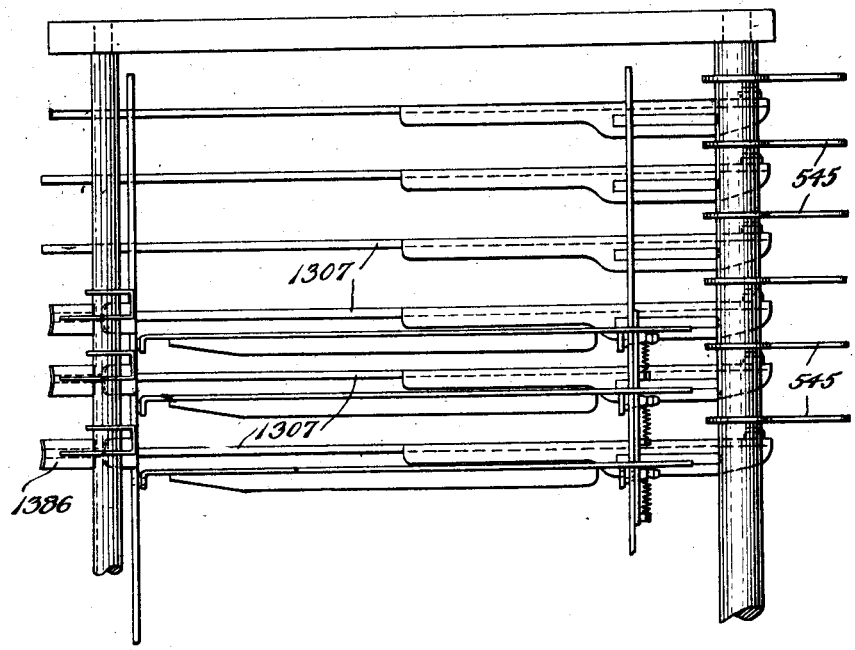
Figure 4:
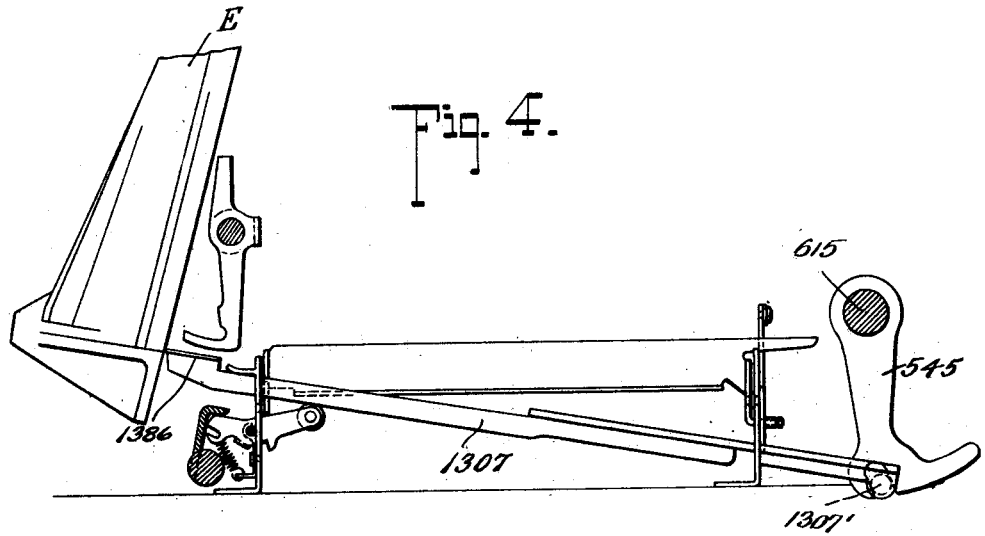

In the accompanying drawings: Figure 1 is a front elevation of the machine embodying the invention, the same being partially broken away to show interior parts. Fig. 2 is a sectionalized right side elevation of the coin paying section, the section being taken just slightly to the right of the single and double payment $20 coin magazine. Fig. 3 is a fragmentary plan view of that portion of the ejecting mechanism utilizing the special flat ejectors for thin coin ejection. Fig. 4 is an elevation of the same, certain parts shown in section. Figs. 5 and 6 are front and right side elevations showing the positive stop mechanism for the second coin or single and double payment coin magazine. Fig. 7 is a plan view of the same mechanism. Figs. 8 and 9 are front and right side elevations of the same mechanism showing the positive stop cammed down to retain the second coin on a single payment. Fig. 10 is a sectionalized right side view of the bell signal mechanism ready to ring the bell. Fig. 11 is a view of the same mechanism showing the mechanism being prevented from ringing the bell by the coin plunger coming in contact with the coin stack. Figs. 12 and 13 are plan views and right side elevations, respectively, of the bell signal mechanism in normal position. Figs. 14 and 15 are top and front views respectively of the detachable coin chute. Fig. 16 is a detail figure showing the manner of engagement of the key with the release shaft. Fig. 17 is a fragmentary view partly in section showing more fully the details of the lock mechanism.

*General construction of the machine.*—The calculating or adding section of the machine is designated A and the money paying section B. The calculating section embodies suitable amount keys C and a disabling key D. It is not believed necessary to describe the details of the mechanisms of either of the sections A and B, these being practically the same in broad principle of action and coöperation of parts as are the corresponding mechanisms of the application previously identified. It may be noted, however, that the money paying section B comprises the money holders or coin receptacles E at the base portions of which operate the ejectors 1307, the majority of the ejectors being adapted to eject a single coin from the associated coin holder E, but certain ejectors being susceptible of adjustment in operation, to discharge one or two coins, this being desirable in order to make up certain amounts where two pennies, two nickels or two coins of other denominations are preferably ejected. The ejectors 1307 are provided at their rear ends with lateral projections 1307' (see Fig. 2). Normally these projections 1307' are not engaged with ejector arms 545 one of which is provided for each ejector and mounted on the ejector shaft 615. By the provision of selector mechanism including the selector bars $a$ having projections $a'$ any one or more of the ejectors 1307 may be moved laterally at its rear end to interlock the projection 1307' with the adjacent arm 545. This interlocking is effected by a longitudinal movement imparted to the selector bars $a$ at the commencement of the forward pull on the handle F which is the main actuator, if the selector bars $a$ are previously set in a position to be engaged by a selector bail 520 (see Fig. 1). The amount keys C of the keyboard A are adapted to engage projections $a''$ of one or more of the selector bars $a$ when the keys C are depressed. Such of the bars $a$ as may be depressed by the action of the keys C will have hooks formed at one end thereof engaged with the bail 520 so that when the bail 520 rocks rearward as seen in Fig. 1, longitudinal movement will be imparted to the bars $a$ that have been thrown into coöperation with the bail. The longitudinal movement of the actuated bars $a$ is transmitted to the rear ends of the ejectors 1307 associated with such bars, through the projections 1307' on these ejectors are thus interlocked with bifurcations at the lower ends of the coacting arms 545 on the ejector shaft 615.

Suitable operating connections not material to the present invention are provided intermediate the main actuating handle and the ejector shaft 615. Thus it is that by the depression of the keys C, the selectors $a$ are set up for subsequent actuation of certain ejectors. Upon the operation of the handle carried by the shaft 625, the selectors initially move to set the ejectors selected in operative connection with the arms 545 of the shaft 615. Afterward, the movement of the handle rocks the shaft 615 and imparts outward movement to the ejectors to discharge the coins. The selectors $a$ are operated by the bail 520, above mentioned, said bail being carried by a shaft 521 and being supplied with suitable connections leading to the handle shaft 625.

*Special ejector.*—As seen in Figs. 3 and 4, the special ejector 1307 for the thin coins such as dimes, is characterized, primarily, by the peculiar formation of its front end. In other words, the ejector 1307 is formed at its front extremity with the coin engaging member 1386, the coin engaging portion or end of which is concave or curved to conform with the curvature of the periphery of the coins with which it is to coöperate. Heretofore, it has been customary to use ejectors, the front edge of which are straight and these are effective for the purpose of ejecting heavier coins in common use. However, where it is necessary to eject dimes, these coins are often so thin that with the old form of ejector, the dimes are not infrequently caused to buckle or be bent upon themselves when the ejector strikes the same, thereby wedging the coin in the holder therefor, and, practically rendering inoperative the dime ejecting mechanism. The foregoing difficulty has been due to the fact that the ejector does not obtain sufficient bearing against the coin. With the front end of the ejector formed on a curvature to give the ejector a bearing against the coins greater than the width of the ejector itself, the defective operation above referred to has been obviated.

*Double payment coin stop mechanisms.*—Figs. 5 to 9 inclusive show what is termed the positive coin stop for the double payment coin holders. Referring to these figures it may be noted that the coöperation between the selector bars $a$, and the ejectors 1307 is established through the provision of selector bails 1370 which are suitably pivoted at 1370' to supports in the paying section B of the machine. These bails 1370 associated with a double payment coin holder E are each provided with a stud 1478 at the end adjacent the coin holder. The coin stop 1550' is movable in front of the holder E and consists of the end of a stop lever 1550 pivoted at 1691 on an adjacent bracket the rear end of the lever 1550 engaging over the hook-shaped terminal of a cam lever 1382. Lever 1382 is pivoted to a stud 1477 and is adapted to be cammed upward by engagement of the stud 1478 therewith, the upward movement being incident to a rocking of the selector bail 1370 actuated by a selector bar $a$. It will be observed, therefore, that as the bail 1370 is rocked the lever 1382 is lifted and thereby rocks the stop lever 1550 lowering the stop 1550' in front of the second coin $e$ from the bottom of the coin holder E. Simultaneously with the above action the stud 1478 cams downward a second lever 1311 over which it extends, the lever 1311 being mounted co-axially with the lever 1382. The lever 1311 has a portion engaging immediately over the coöperating ejector 1307 so that the latter is forced downward to engage only the lowermost coin in the holder E, simultaneously with the lowering of the stop 1550 to engage in front of the second from the lowermost coin in said holder. This second coin is therefore positively retained in the holder against liability of accidental discharge, when a single payment from said holder is demanded. Normally, however, the ejector 1307 is maintained in an upraised position and capable of ejecting two coins e from the holder E until such time as the bail 1370, controlling the single payment, is shifted to cause operation of the parts as just described. The stop 1550' is normally in front of the third coin from the bottom of the holder E until such time as it has its movement to positively govern the single payment action of the ejector with which it is associated. Springs 1382' and 1550ᵃ are connected with the parts 1382 and 1550 respectively.

*Replenishment signal for coin holders.—* This mechanism is shown in Figs. 10 to 13 inclusive of the drawings. At one end of the paying section B of the machine is disposed the bell 1536 with which coacts the tapper 1528 pivoted to the shaft 1053. Also pivoted intermediately to the same shaft is an actuating lever 1526 the rear end of which has spaced projections receiving the tapper 1528 therebetween.

In rear of the coin holders E are mounted controlling levers 1522 one for each coin holder, and having a finger 1522' adapted to enter the coin holder through an opening in the rear wall of the latter adjacent to its bottom portion. The controlling levers 1522 are coaxially mounted upon the shaft 1525 and the upper ends of the levers 1522 are arranged so that when the coins in any one of the holders E are so low as to permit the finger 1522' to enter the holder such lever or levers will rock and the upper end will then be capable of engaging beneath the front portion of a controlling member 1537. The controlling member 1537 comprises primarily a plate with a down-turned front edge engageable by the levers 1522. The member 1537 also comprises end pieces 1535 through which passes the shaft 1699 forming a support for the controlling member permitting slight oscillation of the latter. Springs 1680 connected with ears projecting downward from the controlling member 1537 normally tend to force the front portion of the controlling member downward. The end piece 1535 shown in the drawings has a rearwardly extending arm 1535'' projecting beneath a lateral stud 1527' on a dog 1527 which is pivotally mounted at 1527'' upon an arm 1527ᵃ carried by one end of a sleeve 1526ᵃ receiving the shaft 1053, the other end of the sleeve 1526ᵃ having the member 1526 fixed thereto.

Oscillating motion is imparted to the controlling member 1535 by means of a stud 1689 on an arm 1524 supported by the member 1525. Said arm 1524 is actuated by a link 1532 connected with the stud 1689 at one end, the other end of the link having slotted connection at 1532' with the arm 543 on the ejector shaft 615. The stud 1689 is adapted to engage a cam surface 1535' (see Fig. 11) on the front end portion of the member 1535, the coöperation of the parts being such that in the back and forth movement of the ejector 1507 corresponding movement is imparted to the link 1532 and the arm 1524 to intermittently raise and permit lowering of the controlling member 1537. A spring 1678 is connected with each of the controlling levers 1522 and tends normally to project the finger 1522' into the coin holder E adjacent thereto, the finger normally, however, engaging the coins in the holder and only moving into the latter when the surface of the uppermost coin is beneath the opening through which the finger passes into the holder.

With the foregoing general understanding of the construction of parts, the signaling means automatically operate as follows: Referring to Fig. 10, the coin magazine is shown as requiring replenishment, wherefore the finger 1522' of the controlling lever 1522 has been caused to enter the magazine or holder under the action of the spring 1678. The upper end of the lever 1522 consequently assumed a position beneath the controlling member 1537 preventing the downward movement of said controlling member when the link 1532 moved rearward during the ejecting movement of the ejector 1307. The holding up of the controlling member 1537 by the lever 1522 prevents the normal oscillation of the controlling member from taking place, thereby maintaining the arm 1535'' at the lower limit of its movement permitting the dog 1527 to drop into the path of movement of the projection 1671 on the link 1532. As the ejector 1397 is being restored to the rearward position the forward movement of the link 1532 causes the projection 1671 to trip the dog 1527, rocking the latter and causing the actuating member or driver for the tapper 1528 to move around its center on the shaft 1053; the stud 1527' engages arm 1527ᵃ in doing this, forcing the arm and dog to move up together and turning sleeve 1526ᵃ and forcing member 1526 downward. As soon as the dog 1527 escapes the stud 1671, the actuating member 1526 aforesaid will be pulled back by the spring 1683 and the quick action of the spring suffices to give momentum enough to the tapper 1528 to strike the bell.

When the supply of coins in the holders E is sufficient for the purposes of operation of the machine the signaling mechanism will be prevented from operating in the manner above described owing to the fact that the controlling levers 1522 remain in the positions shown in Fig. 13 and the member 1537 during each forward movement of the ejector 1307 will oscillate, thereby raising its arm 1535" sufficiently to elevate the dog 1527 clear of the stud 1671, under which conditions during the restoring movement of the parts 1307 and 1532 the stud 1671 will not act on the dog and consequently the bell 1536 will not be rung.

*Detachable coin chute.*—Figs. 14 to 17 inclusive, show this feature of the improved machine, the same comprising a simple and advantageous locking mechanism for permitting ready detachment and replacement of the coin chute 925, which is arranged beneath the discharge portions of the several coin holders E and common to all of said holders to receive therefrom the coins and deliver the latter at a single point of delivery. On the base 911 of the machine is mounted a shaft 1018 supported by suitable bearing brackets 952. Locking members 1017 consisting of studs secured on the shaft 1018 are supported by said shaft so as to engage with locking pins 1019, attached to an inwardly extending ledge 925ª formed integral with the body of the chute 925. The pins 1019 are adapted to project downwardly through openings in the base 911 and are formed with annular recesses in which the lower ends of the locking members 1017 are adapted to engage and so interlock with the pins 1019 as to prevent displacement of the chute while the interlocking action is maintained. A spring 1015 is connected with one or both of the members 1017 and tends to force these members into engagement with the pins 1019. On one of its ends the shaft 1018 is provided with a key recess, and a key 1021 is adapted to be passed through a key-hole in one end of the base to engage with the end of the shaft 1018 whereupon by turning the key, the shaft will be rocked to carry the locking members 1017 outwardly from the locking pins 1019 the chute 925 being thus released and susceptible of upward detachment with respect to said base.

Having thus described my invention, what I claim as new is:

1. In combination, a coin holder, an ejector therefor, a pair of levers one of which coacts with the ejector to shift the same whereby the number of coins ejected from the holder may be varied, a coin stop operable by the other of said levers, and an operating member movable between the levers to actuate the same in opposite directions.

2. In combination, a coin holder, a normally inoperative ejector therefor, means for causing ejecting movement of said ejector, means to render the ejector operative comprising a selecting device, means to shift the ejector whereby the number of coins ejected may be varied, a movable coin stop coöperative to prevent ejection of coins other than the one or more coins operated on by the ejector, levers for controlling the last mentioned movement of the ejector and for actuating the coin stop, and an operating member on said selecting device for actuating said levers.

3. In combination, a coin holder, a normally inoperative ejector therefor, means to impart ejecting movement to said ejector, a selecting device controlling the operativeness of the ejector, means to shift the ejector operable by said selecting device whereby to vary the number of coins acted on thereby, a coin stop for detaining from ejectment coins other than the one or more to be acted on by the ejector, and means on said selecting device operable incident to its movement for selecting the ejector to operate the coin stop and said ejector shifting means.

4. In combination, a coin holder, an ejector therefor, a lever engaging over said ejector, a pivoted coin stop in front of the coin holder, a second lever having engagement with said stop beneath the same, and means movable between the levers to cause movement of the same in opposite directions whereby to impart controlling movements to the ejector and the coin stop.

5. In replenishment signaling means for money paying machines, money holders, a signaling member, an operating member for said signaling member, a movable controlling device for maintaining the operating member inactive, ejecting mechanism associated with the holders adapted to normally operate the controlling device on each action of said mechanism, and members operable incident to exhaustion of coins from any holder to act on the controlling member to render the signal operating member operative.

6. In replenishment signaling mechanism for money machines, the combination of money holders, a bell, a tapper coöperative therewith, a controlling member, means operable by the controlling member governing the action of the tapper to effect ringing of the bell, ejecting mechanism for the money holders, means operable by the ejecting mechanism to move the controlling member, and means controlled by the exhaustion of money from the holders whereby to interfere with the normal action of said controlling member and cause operation of the tapper to effect ringing of the bell.

7. In replenishment signaling mechanism for money machines, the combination of money holders, discharging mechanism therefor, signaling means including a bell, a controlling member having connection with said discharging means whereby it is moved upon each operation of the discharging means, a tapper for the bell, means intermediate the controlling member and tapper whereby to actuate the latter, and means to automatically interfere with the normal operation of the controlling member when any one of the coin holders requires replenishing whereby to effect operation of the tapper through the intermediate means previously mentioned.

8. In replenishment signaling mechanism for money machines, the combination of coin holders, ejectors therefor, ejector operating means, a controlling member, means connecting the controlling member with the ejector operating means whereby to impart movement to the controlling member at each operation of the ejectors, a signal, means operable from said controlling member to operate the signal, means to render the last mentioned means normally inactive, and means controlled by replenishment requirements of the holders to interfere with the operation of the controlling member and thereby cause operation of the signal operating means.

9. In replenishment signaling mechanism for money machines, the combination of coin holders, ejectors therefor, ejector operating means, a controlling member, means connecting the controlling member with the ejector operating means whereby to impart movement to the controlling member at each operation of the ejectors, a signal, means operable from said controlling member to operate the signal, means to render the last-mentioned means normally inoperative, and means controlled by replenishment requirements of the holders to interfere with the operation of the controlling member and thereby cause operation of the signal operating means, the last-mentioned means including controlling levers having members movable into the holders as the latter become emptied, said levers being capable of engaging with the controlling member.

10. In replenishment signaling mechanism for money machines, the combination of coin holders, ejectors therefor, ejector operating means, a controlling member, means connecting the controlling member with the ejector operating means whereby to impart movement to the controlling member at each operation of the ejectors, a signal, means operable from said controlling member to operate the signal, means to render the last-mentioned means normally inactive, and means controlled by replenishment requirements of the holders to interfere with the operation of the controlling member and thereby cause operation of the signal operating means, said signal operating means including a dog, and a tapper, the connection between the ejector operating means and the controlling member embodying a link and an arm movable by said link and having a stud engageable with the controlling member to oscillate the same.

11. In replenishment signaling means for money paying machines, money holders, a signaling member, an operating member for said signaling member, a movable controlling device for maintaining the operating member inactive, ejecting mechanism associated with the holders, operating means intermediate said ejecting mechanism and said controlling member whereby to move the latter on each operation of the ejecting mechanism, normally inoperative means for tripping the signal operating member, fingers adapted to enter the money holders and movable thereinto upon predetermined exhaustion of money from said holders whereby to coact with the controlling member to interfere with the abnormal movement of the latter, and means intermediate the controlling member and said trip means whereby the latter is made operative as an incident to the aforesaid interference with the normal movement of the controlling member.

12. In money paying machines, the combination with a base, money holders supported thereon, and a coin chute common to said holders, a locking shaft mounted on the base, locking pins carried by the chute and engaging with the base, locking members on said shaft engaging said pins to prevent displacement of the chute from the base, means normally holding said locking members in engagement with the pins, and a key device coöperative with the shaft to disengage the locking members from the pins aforesaid whereby to permit detachment of the chute from the base.

In testimony whereof I affix my signature in presence of two witnesses.

GU AF RUNQUIST.

Witnesses:
 MABEL BEAVER,
 WINFIELD BEAVER.